UNITED STATES PATENT OFFICE.

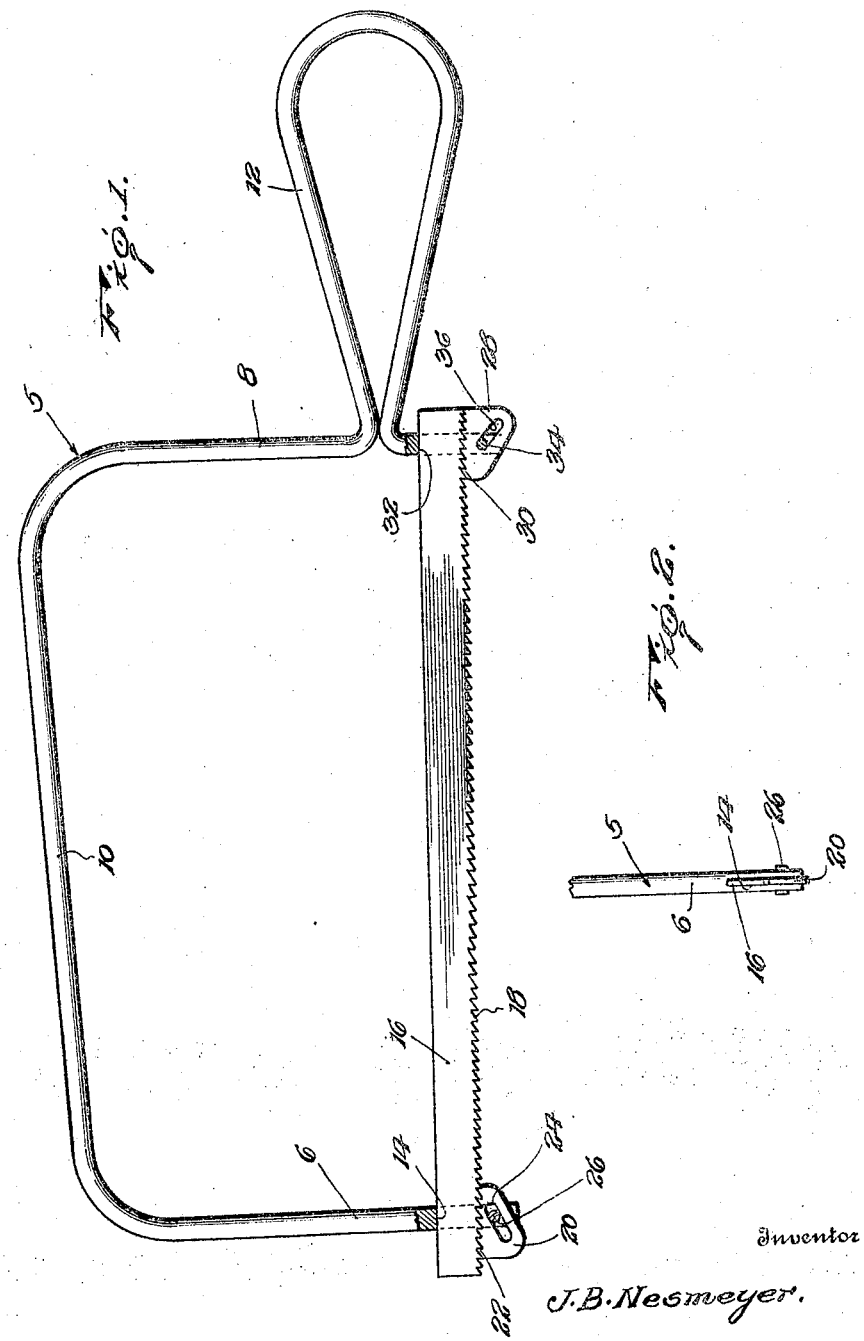

JOHN B. NESMEYER, OF OMAHA, NEBRASKA.

HACK SAW.

1,413,182.  Specification of Letters Patent.  Patented Apr. 18, 1922.

Application filed April 17, 1920. Serial No. 374,599.

*To all whom it may concern:*

Be it known that I, JOHN B. NESMEYER, a citizen of the United States, residing at Omaha, in the county of Douglas and State of Nebraska, have invented certain new and useful Improvements in Hack Saws, of which the following is a specification.

This invention relates to improvements in hack saw frames having novel means for engaging blades.

An important object of this invention is to provide a hack saw frame of approximately U-shaped formation and provided with simple means whereby broken hack saw blades may be connected to the same.

A further object of the invention is to provide a hack saw frame which is provided with novel means whereby the blade may be readily and conveniently loosened or tightened, as desired.

The invention further aims to provide a hack saw frame which is neat in appearance, durable in use and cheap to manufacture.

Other objects and advantages of the invention will be apparent during the course of the following description.

In the accompanying drawing forming a part of this application and in which like numerals are employed to designate like parts throughout the same, Figure 1 is a side elevation of the improved hack saw, parts being broken away, Figure 2 is a fragmentary end elevation of the same.

In the drawing wherein for the purpose of illustration is shown a preferred embodiment of the invention, the numeral 5 generally designates the improved hack saw constructed from a length of round spring metal arranged in U-shaped formation to form front and rear blade engaging arms 6 and 8, respectively, and a longitudinally extending connecting portion 10.

As illustrated in Figure 1, the rear spring arm 8 of the U-shaped frame is formed with a rearwardly extending loop 12 which, in the use of the device, forms a handle whereby the frame may be reciprocated. In forming a handle 12 from the same piece of metal as the frame of the device, the cost of manufacture is appreciably decreased and the device greatly strengthened.

The forward spring arm 6 of the hack saw frame is formed with a slot 14 extending out through its lower end and adapted to slidably receive the forward portion of a hack saw blade 16 which, as illustrated in Figure 1, is formed with a longitudinal series of inclined cutting teeth 18. The means employed for detachably and adjustably securing the forward portion of the hack saw blade 16 to the forward arm 6 of the frame, comprises a dog 20 in the form of a flat piece of metal having one longitudinal edge formed with a series of teeth 22 inclined to conform to the inclination of the teeth 18 so that the same may interlock when brought into engagement. The locking dog 20 is formed with a diagonally extending slot 24 which slidably receives a pin 26 extended through the lower portion of the arm 6. It will be noted that the dog 20 is disposed in the plane of the frame and is movable obliquely of the longitudinal axis of the same. When the forward spring arm 6 is pressed rearwardly, the teeth 18 of the saw blade may be withdrawn from locking engagement with the teeth 22 of the dog 20 so that the dog 20 may be adjusted transversely of the arm 6 or longitudinally of the frame. That is to say, the dog 20 may be positioned so that the pin 26 is positioned in the rear portion of the slot 24 so that the blade may be released from the frame. When it is desired to securely connect the forward portion of the saw blade 16 to the arm 6, it is merely necessary to press the arm 6 rearwardly by engaging the same with a bench or other base and draw the dog 20 rearwardly so that the teeth 22 of the same will be interlocked with the teeth 18 of the blade and so that the rear edge of the blade will be engaged with the rear end of the slot 14.

The means employed for securing the hack saw blade at its rear end portion to the rear handle 8, comprises a dog 28, similar in construction to the dog 20 and provided with a longitudinal series of teeth 30 adapted to interlock with the teeth 16. The dog 28 is arranged within a slot 32 extending out through the lower portion of the arm 8 and provided with a transverse pin 34. The dog 28 which is movable obliquely of the longitudinal axis of the frame is provided with a diagonally extending slot 36 which receives the pin 34, and which may be adjusted so that the teeth 30 of the same may be drawn into locking engagement with the teeth of the saw blade.

When it is desired to connect the hack saw blade to the frame, the rear portion of the blade is first connected to the rear arm 8 through the medium of the locking dog 28. When the rear portion of the blade has been securely connected to the rear arm, the forward portion of the blade is extended through the transverse slot formed in the forward arm 6. With the forward portion of the blade 16 extended through the slot formed in the arm 6, the arm 6 is pressed rearwardly and the dog 20 is also pressed rearwardly and inwardly so that the teeth 22 of the same may be engaged with the teeth of the hack saw blade. The tendency of the arms 6 and 8 to move outwardly causes the dogs to be securely engaged with the blade so that the blade is securely but detachably connected to the frame. When it is desired to tighten the blade, the arms may again be pressed together so that the dog 28 may be engaged with the teeth nearer the center of the blade.

With reference to the foregoing description, it will be noted that the hack saw blade may be readily and conveniently attached to a frame constructed in accordance with this invention and may also be tightened or loosened as desired with a minimum of effort on the part of the operator. A device constructed in accordance with this invention may be used in connection with broken as well as new hack saw blades.

It is to be understood that the form of the invention herewith shown and described is to be taken as a preferred embodiment of the same and that such minor changes in construction and arrangement of parts may be made as will remain within the spirit of the invention and the scope of what is claimed.

Having thus described the invention, what is claimed as new is:

A hack saw comprising a frame having front and rear spaced arms provided with alined slots extending through their lower ends and adapted to receive a saw blade, dogs arranged within said slots and provided in their upper edges with teeth adapted to engage the teeth of a hack saw blade extending through said slots, and pins extending transversely through said slots and held against movement vertically and longitudinally of the saw blade by the arms, said dogs being provided with obliquely arranged slots running in an outward and a downward direction with respect to said blade and slidably receiving said pins whereby the dogs may be adjusted obliquely of the arms to engage a hack saw blade and bind the upper edge thereof against the top walls of the slots in the arms, the direction of said slot in the forward dog forming, with the rear face of a tooth, an acute angle with its apex downward.

In testimony whereof I affix my signature.

JOHN B. NESMEYER. [L. S.]